United States Patent
Chiang

(12) 
(10) Patent No.: US 6,619,174 B1
(45) Date of Patent: Sep. 16, 2003

(54) QUICK RELEASE SAW BLADE CHUCK FOR A SCROLL SAW

(76) Inventor: Pei-Lieh Chiang, No. 12, Nan-Ping Rd., Nan Dist., Taichung City (TW)

( * ) Notice: Subject to any disclaimer, the term of this patent is extended or adjusted under 35 U.S.C. 154(b) by 0 days.

(21) Appl. No.: 10/177,587

(22) Filed: Jun. 20, 2002

(30) Foreign Application Priority Data

May 10, 2002 (TW) ....................................... 91206676 U

(51) Int. Cl.[7] .............................................. B27B 19/02
(52) U.S. Cl. ............................... 83/698.31; 83/698.71; 83/699.21; 83/699.51; 83/581.1; 83/783; 30/329; 30/507; 30/513; 403/321
(58) Field of Search ....................... 83/698.31, 698.71, 83/699.21, 699.51, 786, 581.1, 954, 783–785; 30/329, 330–339, 507, 513; 403/17, 321, 322, 327, 330

(56) References Cited

U.S. PATENT DOCUMENTS

| | | | | |
|---|---|---|---|---|
| 4,949,616 A | * | 8/1990 | Chang | 83/748 |
| 5,016,512 A | * | 5/1991 | Huang | 83/783 |
| 5,105,704 A | * | 4/1992 | Chang | 83/662 |
| 5,327,807 A | * | 7/1994 | Chang | 83/783 |
| 5,363,733 A | * | 11/1994 | Baird et al. | 83/786 |
| 5,896,799 A | * | 4/1999 | Chen | 83/786 |
| 5,941,153 A | * | 8/1999 | Chang | 83/662 |
| 6,463,840 B1 | * | 10/2002 | Chang | 83/783 |

* cited by examiner

*Primary Examiner*—Allan N. Shoap
*Assistant Examiner*—Phong Nguyen
(74) *Attorney, Agent, or Firm*—Akin, Gump, Strauss, Hauer & Feld, L.L.P.

(57) ABSTRACT

A saw blade chuck includes a blade retaining unit, a biasing unit, and a pushing unit. The blade retaining unit is mounted pivotably on a driving arm of a scroll saw. The biasing unit and the pushing unit are disposed on opposite sides of and act upon the blade retaining unit such that the biasing unit biases the blade retaining unit to pivot to a first position, where the blade retaining unit is adapted to engage one end portion of a saw blade, and such that the pushing unit is operable so as to provide a pushing force for pushing the blade retaining unit in a linear direction to cause the blade retaining unit to pivot against biasing action of the biasing unit to a second position, where the blade retaining unit is adapted to disengage from the end portion of the saw blade.

7 Claims, 6 Drawing Sheets

QUICK RELEASE SAW BLADE CHUCK FOR A SCROLL SAW

CROSS-REFERENCE TO RELATED APPLICATION

This application claims priority of Taiwanese application no. 091206676, filed on May 10, 2002.

BACKGROUND OF THE INVENTION

1. Field of the Invention

The invention relates to a saw blade chuck, more particularly to a quick release saw blade chuck which can retain releasably one end portion of a saw blade to a driving arm of a scroll saw.

2. Description of the Related Art

Referring to FIGS. 1 and 2, a conventional scroll saw is shown to include a pair of upper and lower driving arms 12, 13 that hold a saw blade 11 therebetween, a lower blade holder 14, an upper blade holder 15, a blade tension adjusting device 16 and a compression spring 17. The saw blade 11 has a headed upper end portion 111 and a headed lower end portion 112 opposite to the upper end portion 111. The lower blade holder 14 has a mounting end 141 mounted fixedly on the lower driving arm 13, and a blade holder portion 143 that is formed with a notch 142 for engaging the lower end portion 112 of the saw blade 11. The upper blade holder 15 has a mounting portion 151 mounted pivotally to the upper driving arm 12, and a blade holder portion 153 that is formed with a notch 152 for engaging the upper end portion 111 of the saw blade 11. The blade tension adjusting device 16 includes a threaded shank 161 that extends threadedly through the upper driving arm 12 and that is connected to the upper blade holder 15 at one end, and a rotary knob 162 mounted on the other end of the shank 161. The compression spring 17 is sleeved on the shank 161, and has one end abutting against the upper driving arm 12 and an opposite end abutting against the mounting portion 151 of the upper blade holder 15.

In use, with the end portions 111, 112 of the saw blade 11 engaging the upper and lower blade holders 14, 14, rotation of the rotary knob 162 in a first direction causes the shank 161 to move upwardly relative to the upper driving arm 12, thereby causing the upper blade holder 15 to pivot in a first direction for increasing tension of the saw blade 11 and preventing removal of the saw blade 11 from the upper and lower blade holders 15, 14, as shown in FIG. 1. On the other hand, rotation of the rotary knob 162 in a second direction opposite to the first direction causes the shank 161 to move downwardly relative to the upper driving arm 12, thereby causing the upper blade holder 15 to pivot in a second direction opposite to the first direction for permitting removal of the saw blade 11 from the upper and lower blade holders 15, 14 for replacement purposes, as shown in FIG. 2.

The following are some of the drawbacks of the conventional scroll saw:

1. Quick attachment or removal of the saw blade 11 is not possible because of the need to rotate the rotary knob 162 before the upper blade holder portion 153 can be moved to engage or disengage from the upper end portion 111 of the saw blade 11.
2. Proper adjustment of the saw blade tension cannot be conveniently conducted due to the threaded engagement between the shank 161 and the upper driving arm 12. When the tension of the saw blade 11 is too high, the saw blade 11 tends to break easily. On the other hand, when the tension of the saw blade 11 is too low, the saw blade 11 tends to wobble during a cutting operation.

SUMMARY OF THE INVENTION

Therefore, the main object of the present invention is to provide a quick release saw blade chuck that can overcome the aforesaid drawbacks associated with the prior art.

Accordingly, a saw blade chuck of this invention is used to retain releasably one end portion of a saw blade to a driving arm of a scroll saw, and comprises:

a blade retaining unit having a mounting portion adapted to be mounted pivotally on the driving arm, and a blade holder portion that extends from the mounting portion, the blade retaining unit being pivotable relative to the driving arm to pivot from a first position, where the blade holder portion is adapted to engage the end portion of the saw blade, to a second position, where the blade holder portion is adapted to disengage from the end portion of the saw blade;

a biasing unit for biasing the blade retaining unit to pivot to the first position; and a pushing unit operable so as to provide a pushing force for pushing the blade retaining unit in a linear direction to cause the blade retaining unit to pivot to the second position against biasing action of the biasing unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
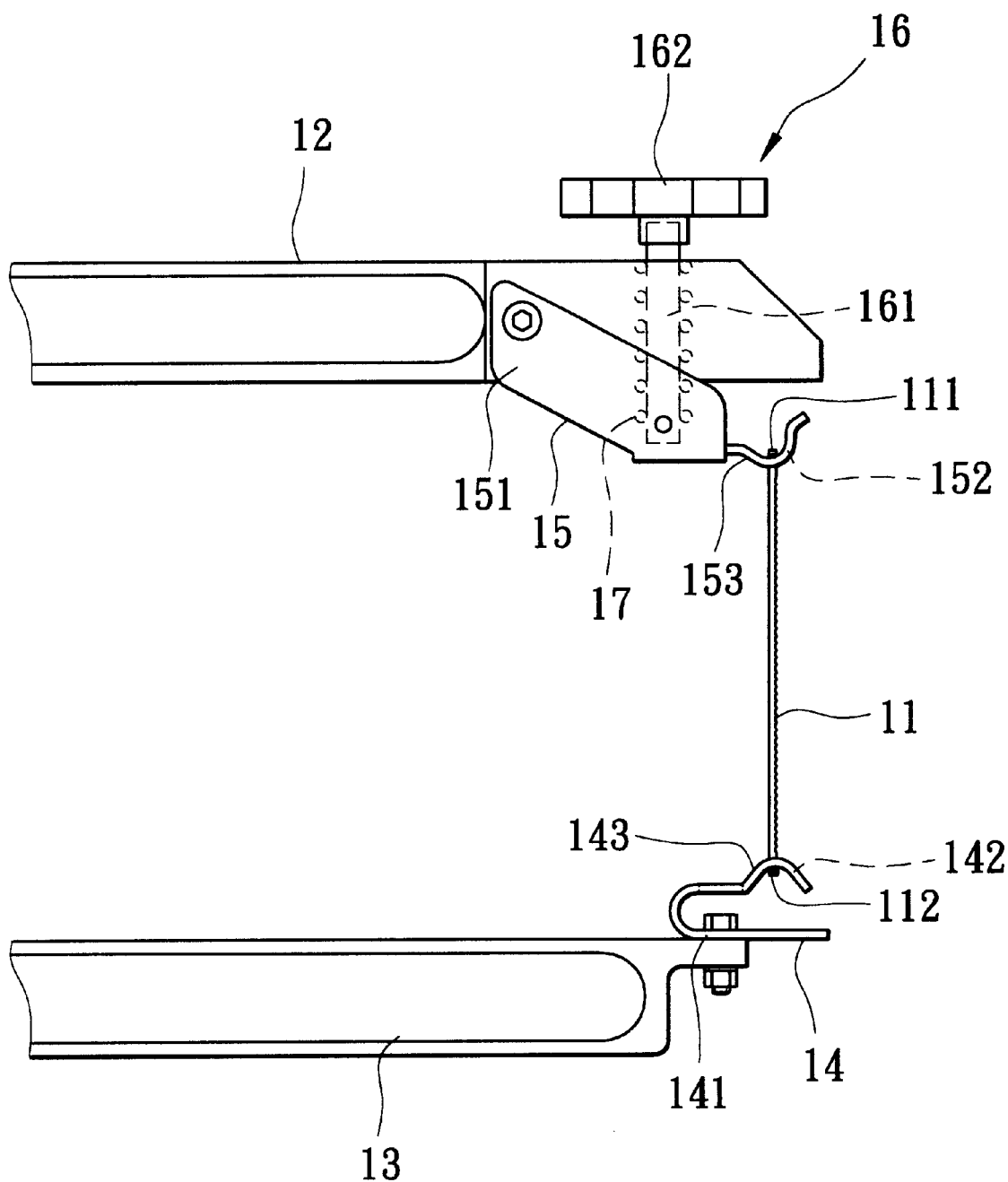
FIG. 1 is a fragmentary schematic view of a conventional scroll saw with a saw blade retained thereon.
Figure 2:
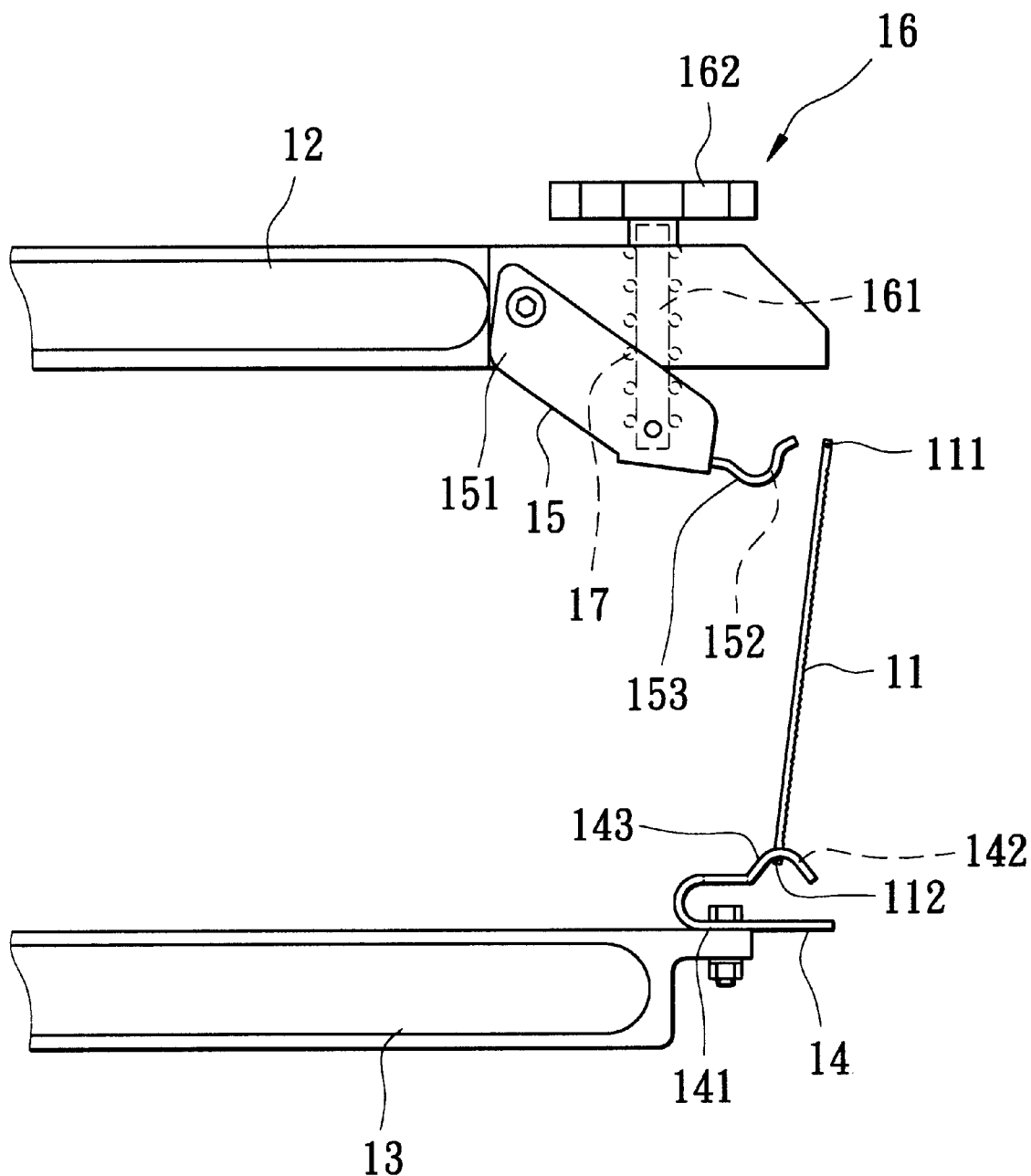
FIG. 2 is a fragmentary schematic view of the conventional scroll saw with the saw blade released therefrom.
Figure 3:
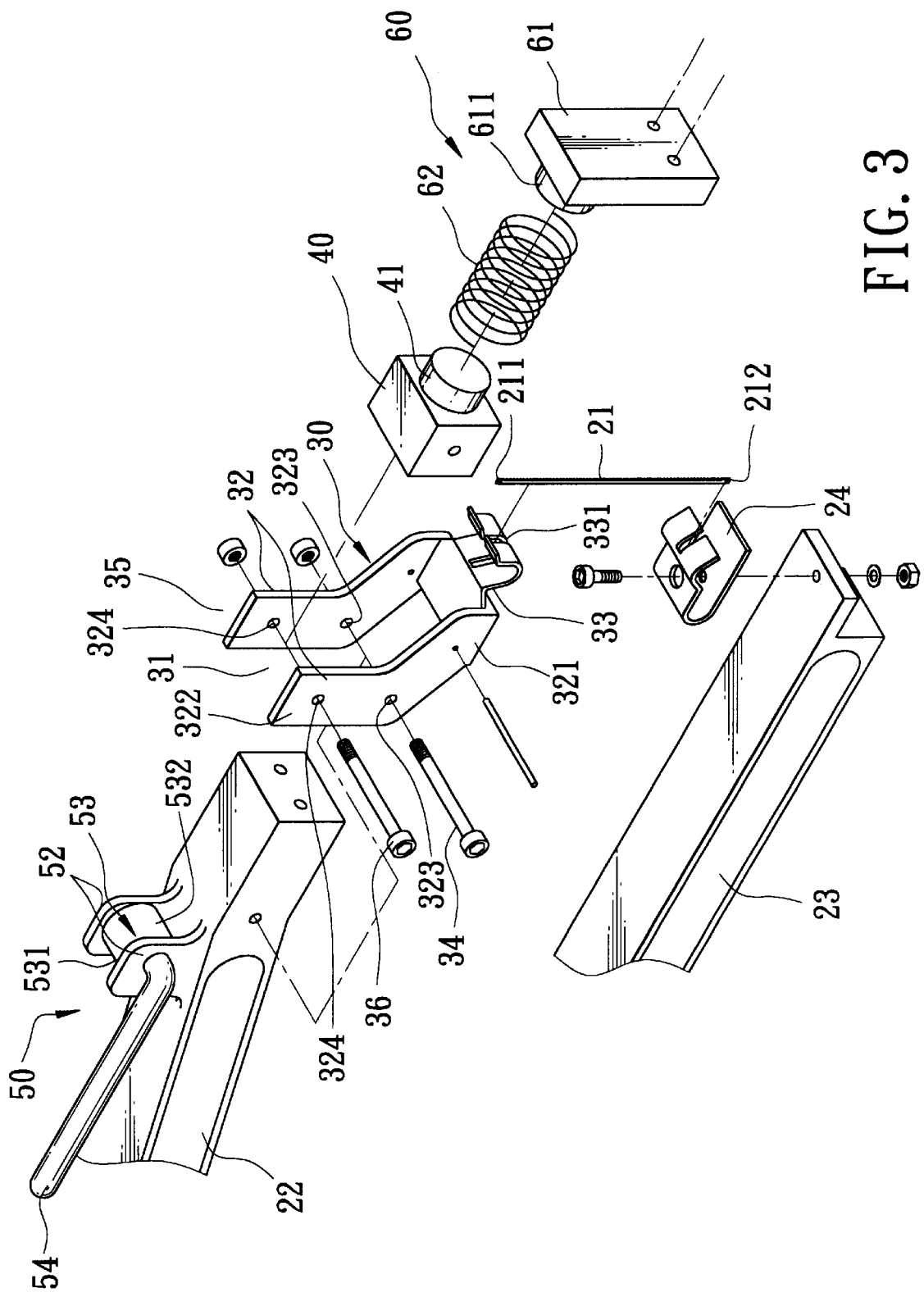
FIG. 3 is an exploded perspective view showing the preferred embodiment of a quick release saw blade chuck according to the present invention.
Figure 4:
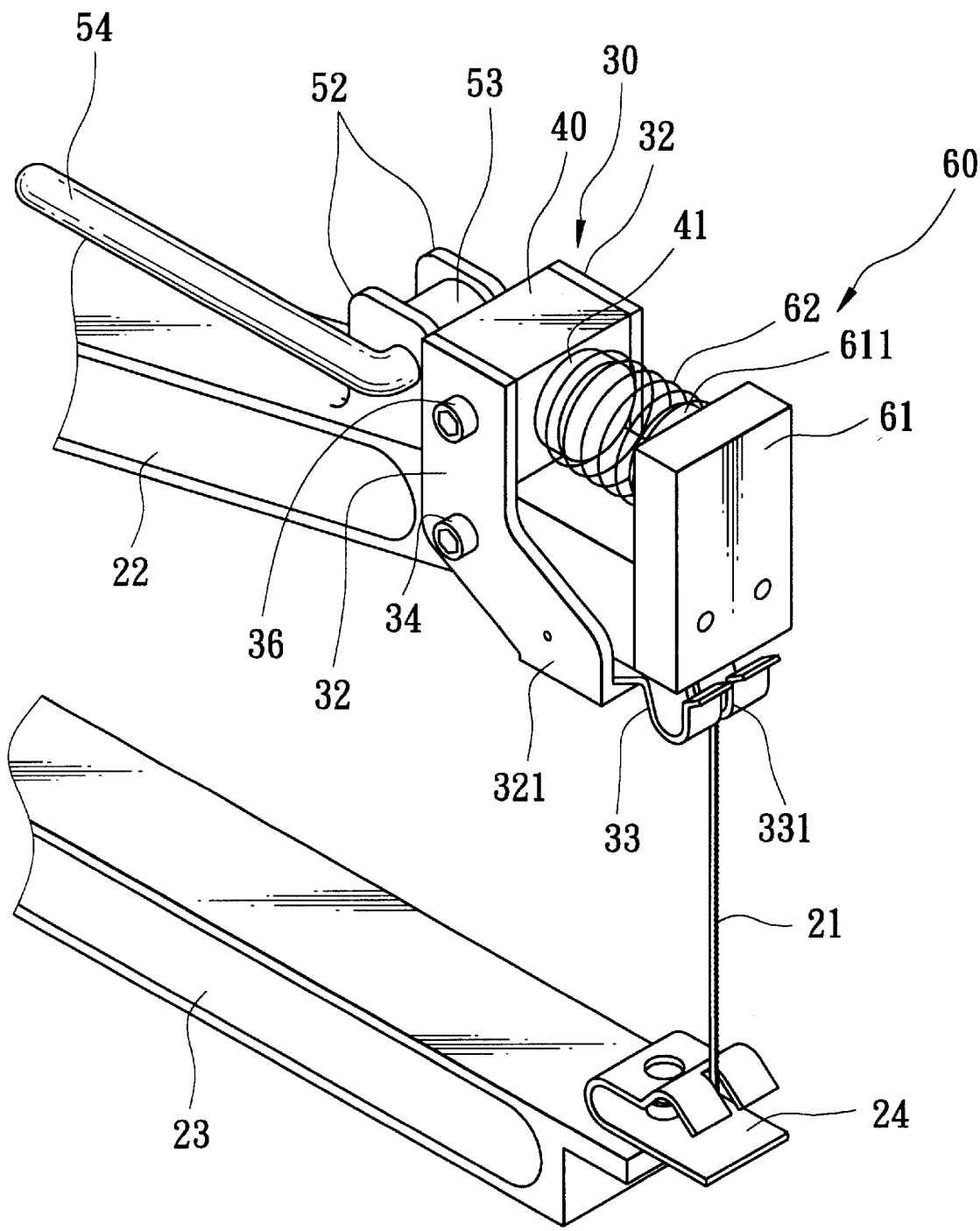
FIG. 4 is an assembled perspective view showing the preferred embodiment when applied to a scroll saw.

Referring to FIGS. 3 and 4, the preferred embodiment of a quick release saw blade chuck according to the present invention is shown to be mounted on a scroll saw that includes a pair of upper and lower driving arms 22, 23. The saw blade chuck cooperates with a lower blade holder 24 on the lower driving arm 23 to retain headed upper and lower end portions 211, 212 of a saw blade 21 on the upper and lower driving arms 22, 23, respectively. The saw blade chuck comprises a blade retaining unit 30, a biasing unit 60 and a pushing unit 50.

The blade retaining unit 30 includes a mounting portion 35, a blade holder portion 33 and an operating block 40. The mounting portion 35 has an upper first section 322 formed as a pair of upright plates 32, and a U-shaped lower second section 321 opposite to the first section 322 and having the blade holder portion 33 extending therefrom. The mounting portion 35 is formed with a pivot hole 323 between the first and second sections 322, 321. The upper driving arm 22 extends between the upright plates 32. A first pivot pin 34 extends through the pivot hole 323 and the upper driving arm 22 to mount the mounting portion 35 pivotally on the upper driving arm 22 about a first pivot axis transverse to a longitudinal axis of the upper driving arm 22. The blade holder portion 33 is formed with a notch 331 for engaging the upper end portion 211 of the saw blade 21. The first section 322 of the mounting portion 35 is further formed with a block mounting hole 324. The operating block 40 is disposed in a space 31 formed by the upright plates 32. A second pivot pin 36 extends through the block mounting hole 324 and the operating block 40 to mount the operating block 40 pivotally on the first section 322 of the mounting portion 35 about a second pivot axis parallel to the first pivot axis. The operating block 40 is slidable along the upper driving arm 22 during pivoting movement of the blade retaining unit 30 about the first pivot pin 34. One side of the operating block 40 is formed with a spring retaining stud 41. The blade retaining unit 30 is pivotable relative to the upper driving arm 22 from a first position (L2), where the blade holder portion 33 is adapted to engage the upper end portion 211 of the saw blade 21 (as shown in FIG. 6), to a second position (L1), where the blade holder portion 33 is adapted to disengage from the upper end portion 211 of the saw blade 21 (as shown in FIG. 5).

The biasing unit 60 is disposed to bias the blade retaining unit 30 to pivot to the first position (L2), and includes a stop block 61 and a coiled compression spring 62. The stop block 61 is adapted to be mounted on a distal end of the upper driving arm 22 and is spaced apart from the operating block 40. The stop block 61 is formed with a spring retaining stud 611. The compression spring 62 has one end sleeved on the spring retaining stud 611 and abutting against the stop block 61, and an opposite end sleeved on the spring retaining stud 41 and abutting against the operating block 40.

The pushing unit 50 is operable so as to provide a pushing force for pushing the blade retaining unit 30 in a linear direction to cause the blade retaining unit 30 to pivot to the second position against biasing action of the biasing unit 60. The pushing unit 50 includes a cam wheel 53 in contact with the operating block 40, and a lever 54 coupled to the cam wheel 53. The cam wheel 53 is disposed between a pair of mounting plates 52 on the upper driving arm 22 such that the cam wheel 53 and the biasing unit 60 are disposed on opposite sides of and act upon the operating block 40. The lever 54 extends rotatably through the mounting plates 52 and is coupled eccentrically and non-rotatably to the cam wheel 53 for driving rotation of the cam wheel 53 on the upper driving arm 22.

Figure 5:
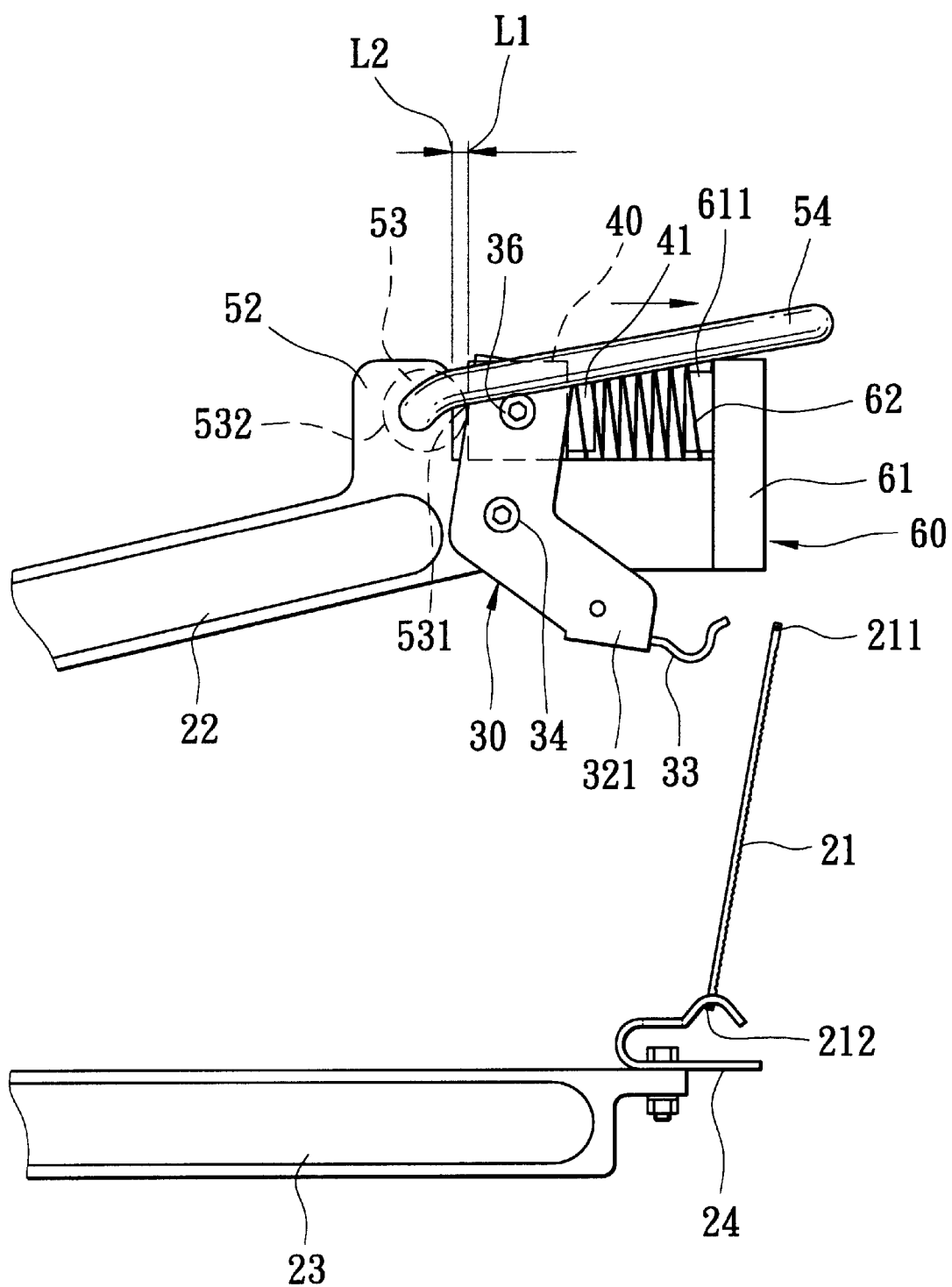
FIG. 5 is a fragmentary schematic view of the preferred embodiment with a saw blade released therefrom.
Figure 6:
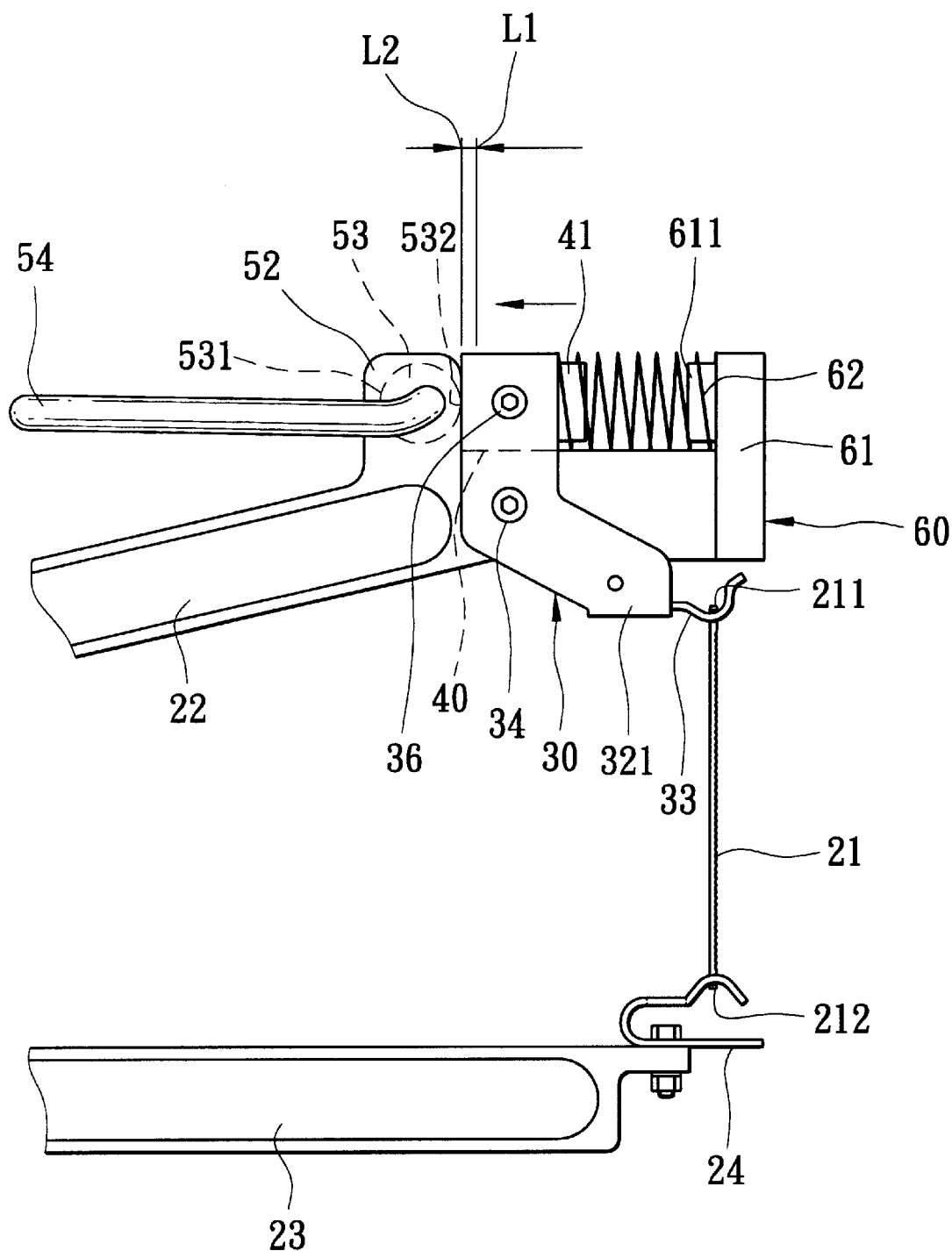
FIG. 6 is a fragmentary schematic view of the preferred embodiment with the saw blade retained thereon.

Referring to FIG. 5, when the saw blade 21 is to be released, the lever 54 is operated to rotate the cam wheel 53 such that a first cam surface 531 of the cam wheel 53 is in contact with the operating block 40, thereby causing the blade retaining unit 30 to pivot to the second position (L1) about the first pivot pin 34 against the biasing action of the compressing spring 62. At this time, the blade holder portion 33 is moved rearwardly relative to the saw blade 21 so as to disengage from the upper end portion 211 of the saw blade 21, thereby permitting replacement of the saw blade 21.

Referring to FIG. 6, when retaining the saw blade 21, the lever 54 is operated to rotate the cam wheel 53 such that a second cam surface 532 of the cam wheel 53 is in contact with the operating block 40, thereby causing the blade retaining unit 30 to pivot to the first position (L2) about the first pivot pin 34 by virtue of the biasing action of the compressing spring 62. At this time, the blade holder portion 33 is moved forwardly relative to the saw blade 21 so as to engage the upper end portion 211 of the saw blade 21, thereby retaining the saw blade 21 on the upper driving arm 22.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A saw blade chuck for retaining releasably one end portion of a saw blade to a driving arm of a scroll saw, said saw blade chuck comprising:

a blade retaining unit having a mounting portion adapted to be mounted pivotally on the driving arm, and a blade holder portion that extends from said mounting portion, said blade retaining unit being pivotable relative to the driving arm to pivot from a first position, where said blade holder portion is adapted to engage the end portion of the saw blade, to a second position, where said blade holder portion is adapted to disengage from the end portion of the saw blade;

a biasing unit for biasing said blade retaining unit to pivot to the first position; and a pushing unit operable so as to provide a pushing force for pushing said blade retaining unit in a linear direction to cause said blade retaining unit to pivot to the second position against biasing action of said biasing unit.

2. The saw blade chuck as claimed in claim 1, wherein said mounting portion of said blade retaining unit has a first section and a second section opposite to said first section and having said blade holder portion extending therefrom, said mounting portion being adapted to be mounted pivotally on the driving arm between said first and second sections, said blade retaining unit further including an operating block mounted pivotally on said first section of said mounting portion and adapted to slide along the driving arm during pivoting movement of said blade retaining unit between the first and second positions, said biasing unit and said pushing unit being disposed on opposite sides of and acting upon said operating block.

3. The saw blade chuck as claimed in claim 2, wherein said mounting portion is adapted to be mounted pivotally on the driving arm about a first pivot axis transverse to a longitudinal axis of the driving arm, said operating block being mounted pivotally on said first section of said mounting portion about a second pivot axis parallel to the first pivot axis.

4. The saw blade chuck as claimed in claim 2, wherein said pushing unit includes a cam wheel adapted to be mounted rotatably on the driving arm and in contact with said operating block.

5. The saw blade chuck as claimed in claim 4, wherein said pushing unit further includes a lever coupled to said cam wheel for driving rotation of said cam wheel.

6. The saw blade chuck as claimed in claim 5, wherein said lever is coupled eccentrically to said cam wheel.

7. The saw blade chuck as claimed in claim 2, wherein said biasing unit includes a stop block adapted to be mounted on the driving arm and spaced apart from said operating block, and a compression spring having one end abutting against said stop block and an opposite end abutting against said operating block.

* * * * *